United States Patent

[11] 3,611,127

| [72] | Inventor | Robert E. Vosteen |
| | | 315 W. Center St., Medina, N.Y. 14103 |
| [21] | Appl. No. | 759,913 |
| [22] | Filed | Sept. 16, 1968 |
| [45] | Patented | Oct. 5, 1971 |

[54] ELECTROSTATIC POTENTIAL AND FIELD MEASUREMENT APPARATUS HAVING A CAPACITOR DETECTOR WITH FEEDBACK TO DRIVE THE CAPACITOR DETECTOR TO THE POTENTIAL BEING MEASURED
11 Claims, 7 Drawing Figs.

| [52] | U.S. Cl. | 324/72, 317/246 |
| [51] | Int. Cl. | G01r 31/02 |
| [50] | Field of Search | 324/72, 32, 118; 317/246, 250; 340/200 |

[56] References Cited
UNITED STATES PATENTS

| 2,830,114 | 4/1958 | Carlson | 340/200 |
| 3,290,595 | 12/1966 | Novotny | 317/250 |
| 3,404,341 | 10/1968 | Young | 324/118 |
| 3,256,481 | 6/1966 | Pulvari | 324/32 |
| 3,344,344 | 9/1967 | Wales | 324/32 |

OTHER REFERENCES

Scherbatskoy et al., The Capacitive Commutator; The Review of Scientific Inst.; Vol. 18, No. 6, June 1947, pp. 415–421 (Copy in 340–200)

Bluh et al., Vibrating Probe Electrometer for The Measurement of Bioelectric Potentials; The Review of Scien. Inst., Vol. 21, No. 10, Oct. 1950, pp. 867–868 (Copy in 324–321)

*Primary Examiner*—Rudolph V. Rolinec
*Assistant Examiner*—R. J. Corcoran
*Attorney*—Irons, Stockman, Sears and Santorelli ABSTRACT: An electrostatic meter arrangement to selectively operate as an electrostatic fieldmeter or voltmeter having a vibrating capacitor detector to detect the function to be measured. The vibrating capacitor detector comprises part of a probe assembly which may also have a preamplifier associated therewith for mounting in a compact housing. A power supply having associated circuits to prevent dangerous buildup of excessive energy is provided to insure operational safety of the meter arrangement for use in hazardous locations, such as locations having atmospheres conducive to explosions, is provided. The meter arrangement operates in noncontacting arrangement with the surface having an electrostatic potential to be measured. Safety circuits are associated with the preamplifier to prevent damage to elements thereof in the event that overload operating conditions occur.

PATENTED OCT 5 1971 3,611,127

INVENTOR
ROBERT E. VOSTEEN

ATTORNEYS

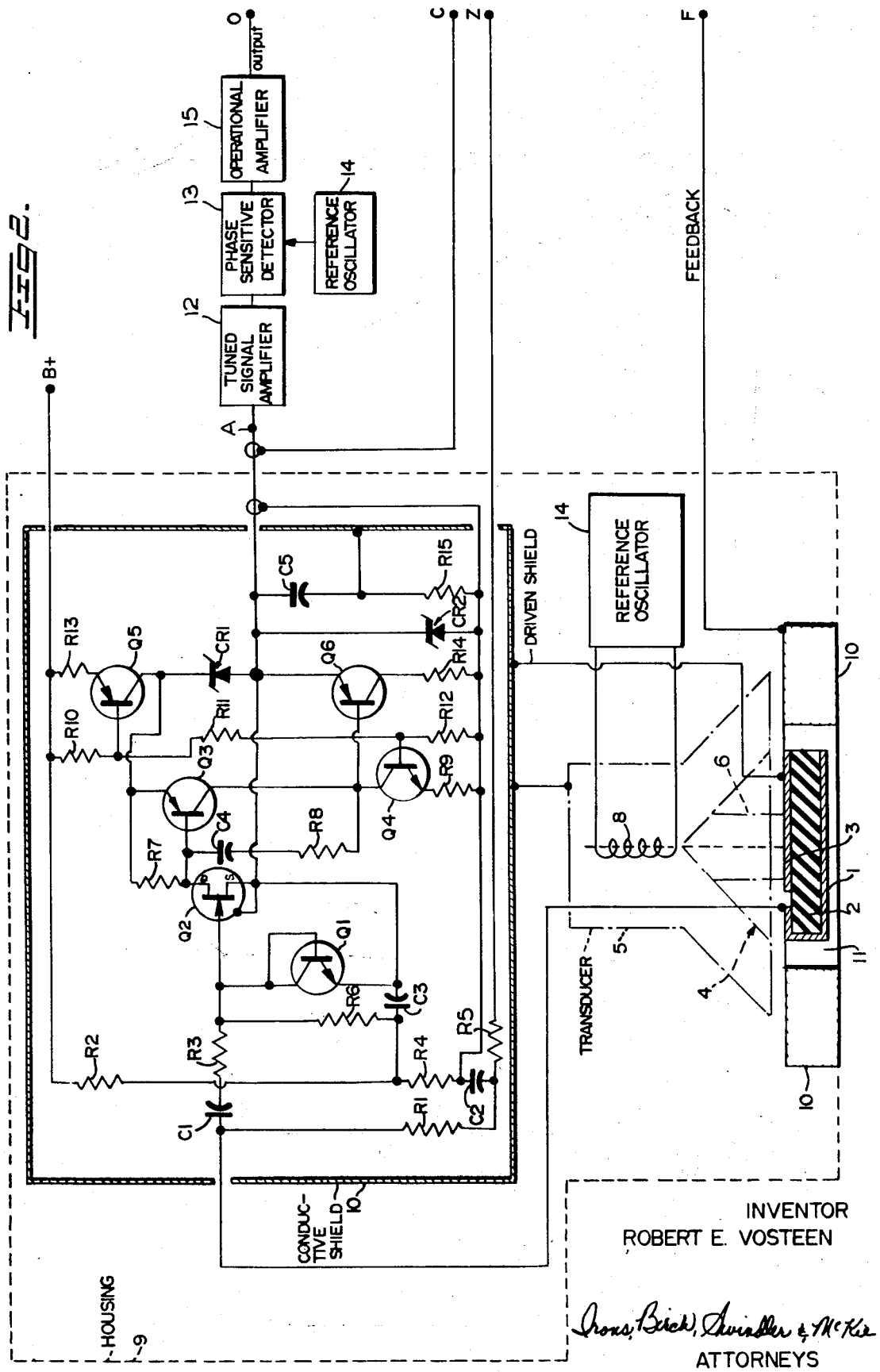

ELECTROSTATIC POTENTIAL AND FIELD MEASUREMENT APPARATUS HAVING A CAPACITOR DETECTOR WITH FEEDBACK TO DRIVE THE CAPACITOR DETECTOR TO THE POTENTIAL BEING MEASURED

BACKGROUND OF THE INVENTION

1. Field of the Invention

The invention relates to an electrostatic meter arrangement that can selectively be utilized to measure electrostatic potentials of surfaces as well as electrostatic fields. It employs a vibrating capacitor detector which is capable of detecting the function to be measured. A preamplifier and associated power supply circuit are utilized to enhance the operational safety of the meter in especially dangerous locations, such as those conducive to explosions and to prevent damage to the preamplifier should overload conditions occur.

2. Description of the Prior Art

The prior art teaches the utilization of probe assemblies and associated voltmeters to measure electrostatic fields, and electrostatic potentials of surfaces in noncontacting manner. SUch prior art probe assemblies normally employ the use of a "chopper" type of capacitor detector, wherein a mechanical chopper in the form of a rotating plate defining a series of apertures is utilized to vary the capacitance thereof to generate a signal indicative of the magnitude and polarity of the function to be measured.

Obviously the use of such mechanical devices is subject to defects, especially since synchronization thereof and proper operating speed is essential to obtain accurate measurements. Further, such prior art measuring devices are subject to mechanical breakdown and resulting high maintenance costs, in addition to the relatively high initial cost of the equipment.

Other prior art electrostatic measuring devices for use in measuring electrostatic potentials and/or electrostatic fields have associated preamplifiers and power supplies which are hazardous for use in certain locations, such as those in which explosions are likely to occur if sufficient spark energy is developed. Still other prior art circuits are not sufficiently sensitive to enable accurate measurements to be made.

SUMMARY OF THE INVENTION

These and other defects of prior art electrostatic measuring devices for use in measuring electrostatic potentials of surfaces and/or electrostatic field strength are solved by the present invention. In particular, a probe assembly having a vibrating capacitor detector is used in conjunction with a preamplifier. Both are housed in a compact housing.

An electromechanical driver, which may consist of an ordinary PM speaker, is employed, with a sensitive electrode of the capacitor detector being joined thereto. Movement of the sensitive electrode within the electrostatic field to be measured, or in proximity to the surface having an electrostatic potential to be measured, causes a corresponding voltage to be generated by the vibrating capacitor detector which is indicative of the magnitude and polarity of the function to be measured.

The generated signal is applied to a preamplifier having associated circuits which protect circuit elements such as the input FET transistor in the event that overload operating conditions occur.

The output of the preamplifier is connected to a tuned signal amplifier, and the output of the latter is connected to a phase sensitive detector. THe carrier frequency signals associated with the electromechanical driver are supplied by a reference oscillator, and the output of the reference oscillator is also supplied to the phase sensitive detector in order to provide detection of signals applied thereto. The output of the phase-sensitive detector is applied to an operational amplifier. Appropriate measuring devices are connected to the output of the operational amplifier by utilization of selected circuits, depending upon whether the electrostatic potential of a surface or an electrostatic field is to be measured.

A power supply is associated with the circuit, and a current limiter is operatively associated therewith, in order to prevent excessive energies from being applied to the preamplifier and the probe assembly. This insures against possible damage to the probe assembly and prevents excessive energy in the form of sparks from being developed. This makes the measuring circuit especially useful in hazardous locations, such as those conducive to explosions.

BRIEF DESCRIPTION OF THE DRAWINGS

FIG. 2 is an electrical schematic diagram of the preamplifier connected to the vibrating capacitor detector, and a partial block diagram of the output circuits connected thereto;

DETAILED DESCRIPTION OF THE INVENTION

In order to provide a satisfactory and economic vibrating capacitor detector, it is only necessary to attach by adhesive or other means a metallic vibrating electrode to an insulator, which in turn is similarly attached to the cone of a standard moving voice coil PM transducer. This provides for vibrating the capacitor detector, but exposes the vibrating electrode to serious electrostatic coupling to the voice coil, which although it is operated at low impedance and therefore low voltage, would seriously impair performance of the capacitor detector. Also, if the vibrating electrode is in close proximity to the frame of the transducer, an undesired capacitance loading is introduced, which also seriously impairs the performance of the capacitor detector.

Only one surface of the vibrating electrode is coupled to the quantity or source to be detected, the opposite surface (of equal area) is solely an undesirable path for capacitance loading and electrostatic signal induction.

To minimize these undesired effects, the vibrating element of the capacitor detector comprises a sandwich consisting of two conductors separated by a thin, rigid dielectric material as shown in FIG. 2.

Figure 1:
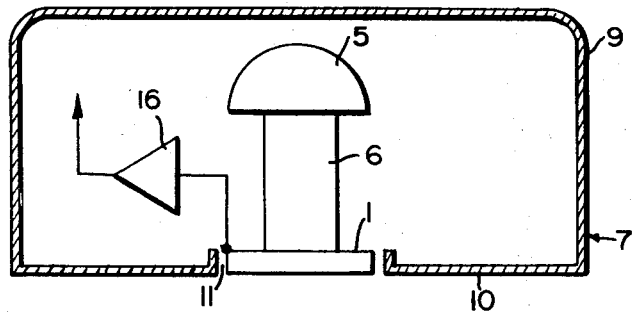
FIG. 1 is a one-dimensional view of the probe assembly, showing the vibrating capacitor detector and the preamplifier.

Sensitive electrode 1 comprises a noble metal such as gold. A substrate 2 of dielectric material is sandwiched between sensitive electrode 1 and driven electrode 3. The latter comprises a conductive metal material, driven need not necessarily comprise a noble metal such as gold. Sensitive and driven electrodes 1 and 3 may be adhesively or otherwise joined to substrate 2 to form the sandwich. Driven electrode 3 may be secured by conventional adhesive or mechanical means to cone 4 of electromechanical driver 5 through insulated mounting 6 (FIG. 1). The electromechanical driver may comprise a conventional electrodynamic transducer having voice coil 8.

As shown in FIG. 2, sensitive electrode 1 is coupled by the series connection of capacitor C1 and resistor R3 to the gate of FET transistor Q2. Driven electrode 3 is connected to the output of the preamplifier, a unity gain voltage follower, (A>+0.999b) thus providing an excellent shield between sensitive electrode 1 and voice coil 8 as a source of undesired input. The distributed capacitance effect on the capacitor detector is further reduced by floating the frame of the transducer and also driving it from the preamplifier output.

The probe assembly 7 comprises preamplifier 16, and the vibrating capacitor detector mounted in compact housing 9 (FIG. 1). The side of housing 9 immediately opposite sensitive electrode 1 defines bottom plate 10 having an aperture 11 substantially opposite and coextensive to the outer surface of sensitive electrode 1, which is coupled to the unknown quantity or source to be measured.

As conventionally known, the voltage across the plates of a parallel plate capacitor in air is $V=(l \times Q)/k_0 A$, where $l$ of course is the distance between the two plates of the capacitor. Sensitive electrode 1 may be considered as comprising one plate of a parallel plate capacitor. If it is assumed that parameters $Q$, $k_0$, and $A$ are constant, voltage $V$ is directly proportional to the distance between the first and second plates ($l$). The corresponding considerations are simplified for the case in which $V \alpha l$.

The discharge time constant of a vibrating capacitor detector is normally chosen such that the charge on the capacitance remains essentially constant through one cycle of capacitor vibration.

Then a displacement of the sensitive electrode of $\Delta l$ results in a proportional change in the voltage across the plates of the capacitor since $\Delta V \alpha \Delta l$. Thus, if a capacitor has a DC voltage of one volt across its plates and undergoes a vibration excursion of 10 percent of the total displacement $l$ of its plates, a peak-to-peak voltage of 100 millivolts will be generated across its plates.

A practicable vibrating capacitor detector has a static capacitance in the order of tens of picofarads. Under these circumstances, the voltage generated by relative displacement of the plates comprising the capacitor is highly attenuated if the capacitor detector is connected to a load having significant capacitance. It is therefore imperative that the capacitance of the connected load be minimized. This may be achieved by utilizing a preamplifier load having a very high input resistance and very low input capacitance.

FIG. 2 shows the preamplifier utilized in conjunction with the vibrating capacitor probe assembly according to the invention. The preamplifier illustrated comprises a wide-band operational type amplifier connected as a voltage follower. By utilizing an amplifier having an operational gain well in excess of 1,000 at the carrier frequency of the vibrating capacitor detector, the amplifier closed-loop gain will exceed +0.999. This serves to reduce any capacitance driven by the amplifier output to less than 0.001 of its initial value.

A contact potential will normally exist between the sensitive electrode and a reference grounded surface because they comprise dissimilar metals, or in the instance were both the sensitive electrode and the reference grounded surface are goldplated, because of the dissimilar adsorbed or surface contaminants. It is desirable to null out this residual offset in many circumstances. In the circuit shown in FIG. 2 this is achieved by a DC discharge path with respect to circuit common through resistor R1 and R5. The latter is connected to an adjustable ±1-volt DC source referenced to the frame of the probe (circuit common).

Capacitor C1 functions as a coupling capacitor between the vibrating capacitor detector and the preamplifier. It blocks the DC preamplifier bias from being applied to sensitive electrode 1. Should the DC bias not be blocked as described, it would introduce an additional undesirable residual offset.

Thus capacitor C1 is connected between sensitive electrode 1 and resistor R3. The latter functions as a protective resistor to prevent destruction of input FET Q2, which could occur should the base of FET Q2 be directly coupled to capacitor C1. In such an instance, the base input of FET Q2 would effectively directly contact sensitive electrode 1 which could possibly directly contact high voltage.

Transistor Q1 comprises an NPN transistor connected as a diode between the input and source of FET Q2, which is connected to the output of the voltage follower preamplifier. It alternatively may comprise a zener diode. The collector of transistor Q1 is connected to its base and the series connection of resistor R3 and the gate of transistor Q2. Its emitter is connected to the series connection of capacitor C3 and source S of FET Q2 which is also connected to the preamplifier output. The Series connection of capacitor C3 and resistor R6 is connected between the emitter of transistor Q1 and the series connection of resistor R3 and the gate of transistor Q2. Further the common connection of resistor R6 and capacitor C3 is connected to the common connection of resistor R4 and resistor R2. Since the preamplifier voltage follower has a gain that exceeds +0.999, its effective conductance and capacitance is reduced to a negligible value.

The output of the preamplifier is limited during overload conditions by zener diode CR2, connected between output terminal A (source S) and circuit common. When the preamplifier is overloaded, zener diode CR2 and transistor Q1 may conduct. Either may conduct as a forward biased diode or as a zener diode depending upon the polarity of the input overload. When such conduction occurs, the FET gate and output circuits are limited to a potential lower than the FET destruction potential. Transistor Q1 connected as a diode thereby functions as a protective circuit to prevent destruction of FET transistor Q2 under overload conditions.

Transistor Q1 connected as a diode, exhibits a typical resistance of greater than 1,000 megohms and a typical capacitance of less than 10 picofarads.

The voltage follower preamp exhibits a typical gain of greater than +0.999.

Q1 is connected between the input and the output of the preamplifier.

Q1 thus exhibits a loading effect on the preamplifier source which is reduced by a factor of greater than 1,000 by feedback thus becoming an effective load in normal operation of greater than $10^{12}$ ohms in parallel with less than 0.01 pf.

Its normal loading effect is therefore negligible.

FET transistor Q2 is an N-channel junction FET which functions as the preamplifier active input element. Resistors R2, R4 and R6 bias its gate. The series connection of resistor R2 and R4 is connected between the preamplifier positive supply terminal B+ and circuit common. It functions as a voltage divider, with the series connection of resistors R2 and R4 being connected to the junction of capacitor C3 and resistor R6. The latter functions as a gate leak resistor, which is bootstrapped to an extremely high value by capacitor C3 connected to the preamplifier voltage follower output at source S of FET Q2.

The probe assembly may under certain operating conditions be exposed to DC transients which could be large compared to the linear operating range of the input. For example, charges could be accumulated by the vibrating capacitor detector in response to airborne charges in the surrounding atmosphere. If the input resistance of the preamplifier were infinite, it would be possible to induce a charge on the sensitive electrode without the provision of a discharge path. Resistor R1 is therefore connected between sensitive electrode 1 and the series connection of capacitor C2 and resistor R5 to function as a discharge path for dissipating such charges. Its resistance value is chosen to provide in conjunction with its source capacitance a time constant that is short but relatively long compared to the vibration period of the probe. Capacitor C2 serves to bypass AC noise signals.

Drain D of FET transistor Q2 feeds the base of PNP transistor Q3 and drain load resistor R7. The collector of NPN transistor Q4, a current source, is connected to the collector of transistor Q3 and functions as a load for the latter. The series connection of the collectors of transistors Q3 and Q4 is connected to the base of PNP transistor Q6.

The series connection of capacitor C4 and resistor R8 is connected between the base of transistor Q3 and the collector of transistor Q3, as well as to the base of transistor Q6. Thus the load for transistor Q3 is the collector of transistor Q4, a current source, and the base of transistor Q6, the output emitter follower. The described parallel combination of transistors Q4 and Q6 provides an extremely high dynamic load impedance and therefore high second stage gain. (Considering FET Q2 to comprise the first stage).

The series connection of capacitor C4 and resistor R8 functions to control the rolloff of the preamplifier to provide a dominant lag and thus insure stability of the preamplifier as a unity gain voltage follower.

The collector of PNP transistor Q5 is connected to the emitter of transistor Q6 via zener diode CR1 and functions as a constant current load for the latter. The collector of transistor Q5 is also connected to the emitter of transistor Q3 and to resistor R7 for reasons to be explained.

As described above, a connection is made from the amplifier output at the emitter Q6 to source S of FET Q2 to convert the preamplifier into a precision AC voltage follower having direct coupled feedback. This insures stability of the DC operating biases of the voltage follower.

The input capacitance of the preamplifier should be as small as practicable as previously explained. It is desirable therefore to markedly reduce the input capacitance effect of FET Q2. The gate-source capacitance thereof may be reduced to an extremely small value by closing the feedback loop causing the source to precisely follow the gate. THe gate-drain capacitance however would normally remain excessively large.

To solve this problem, an FET drain bootstrapping circuit is employed. To provide such feedback, zener diode CR1 is connected between the emitter of output emitter follower transistor Q6 (the preamplifier output terminal A) and the constant-current load therefore, Q5. The cathode end of zener diode CR1 functions as the power source for drain D of FET Q2 and the emitter of transistor Q3 of the second stage. It thus functions to bootstrap drain D of FET Q2 to provide the desired reduction in gate-drain capacitance.

It is desirable also that the distributed capacitance of the circuit be as low as practicable. The distributed capacitance may be decreased by surrounding the preamplifier with a conductive shield as shown in FIG. 2. The conductive shield may comprise a coating of conductive paint such as silver connected to the preamplifier voltage follower output at the series connection of capacitor C5 and resistor R15. The described series connection functions to eliminate the DC component of the preamplifier voltage follower output to minimize any possible error due to DC leakage between the amplifier output and its high impedance input.

Resistors R9 and R13 respectively are connected in the emitter circuits of transistors Q4 and Q5 and resister R14 is connected in the collector circuit of transistor Q6 to serve conventional functions. Resistors R10, R11, and R12, connected in series between the positive supply terminal B+ and circuit common, determine the base-emitter bias characteristics of transistors Q4 and Q5.

The output terminal A of the preamplifier is connected to the input of signal amplifier 12. The signal amplifier functions to increase the amplitude of the signal output of the preamplifier. The output of the signal amplifier is applied to phase sensitive detective 13, which, for example, may be of the type disclosed in applicant's copending application Ser. No. 567,973, filed July 26, 1966, now Pat. No. 3,525,936.

Pure sine wave signals at a predetermined frequency are applied to voice coil 8 of the transducer by reference oscillator 14 to vibrate the cone of the transducer and thereby cause detector signals generated by the capacitive detector to modulate a carrier frequency signal equal to the predetermined frequency. The reference oscillator is also connected to phase-sensitive detector 13 to enable detection of the modulated detector signal. An operational amplifier 15 functioning as an integrator is connected to the output of phase sensitive detector 13.

Figure 3:
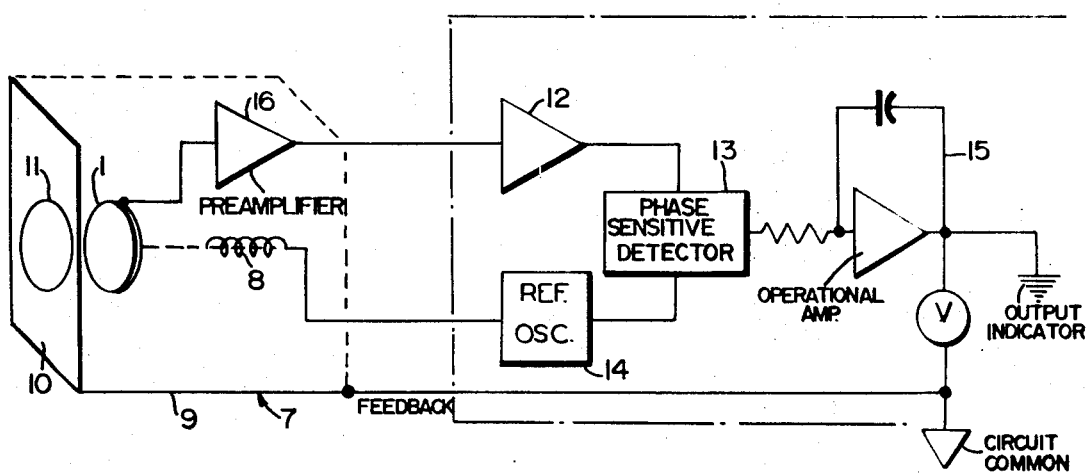
FIG. 3 is a block diagram showing the use of the circuit according to the invention as an electrostatic millivolt meter.
Figure 4:
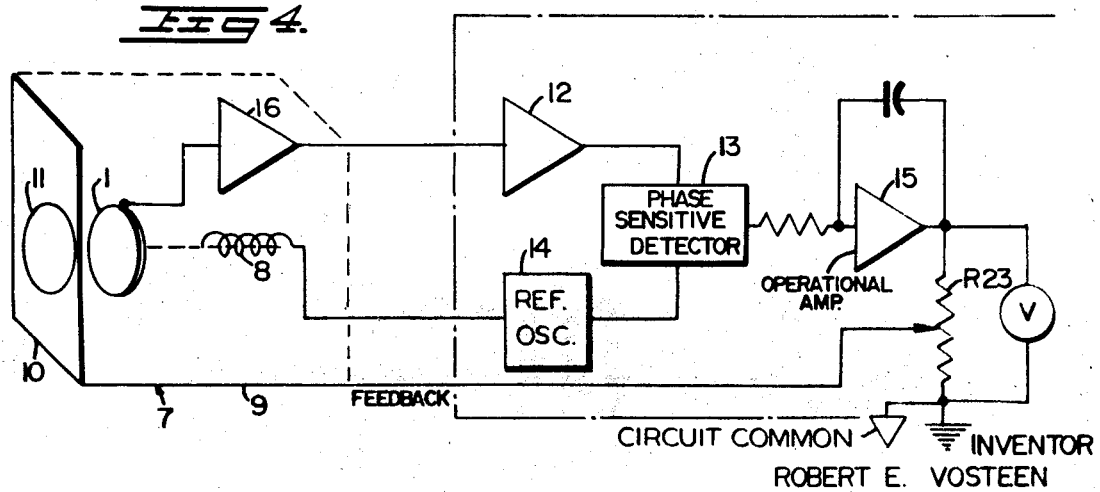
FIG. 4 is a block diagram showing the use of the circuit according to the invention as an electrostatic fieldmeter.

FIG. 3 shows use of described probe assembly 7 as a millivolt meter to measure the electrostatic potential of a surface. FIG. 4, on the other hand, shows the use of the probe assembly as an electrostatic fieldmeter. It is seen that the circuits are similar, with the exception of the feedback circuit from the output of operational amplifier 15 to the probe assembly, and the connection of ground relative to circuit common and operational amplifier output to effect the desired measurement.

Figure 5:
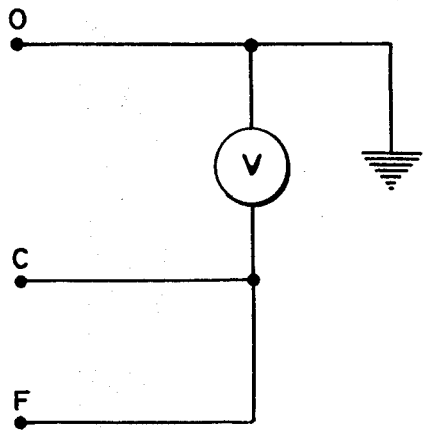
FIG. 5 is an electrical schematic diagram of the output portion of the circuit according to the invention showing how it may function as a millivolt meter.
Figure 6:
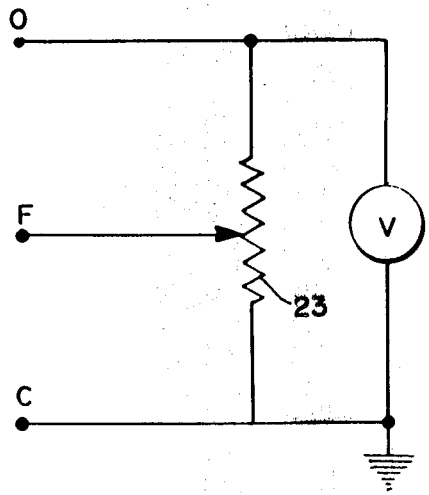
FIG. 6 is an electrical schematic diagram of the output portion of the circuit according to the invention showing how it may function as an electrostatic fieldmeter.

The difference in connections, and particularly the feedback connection between the output of operational amplifier 15 and the probe assembly can be more fully described with reference to FIGS. 5 and 6. Thus, where the device is to be used as a millivolt meter (as shown in FIG. 3), the circuit common line C and feedback line F are connected, and the output line O is connected to ground. The voltmeter is always connected between operational amplifier output and circuit common. This is shown in FIG. 5.

On the other hand, when the device is to be used as an electrostatic fieldmeter (as shown in FIG. 4), circuit common, C, is grounded. Further, a potentiometer comprising resistor 23 connected between output line O of operational amplifier 15 and circuit common line C is provided, with the associated tap being connected to feedback line F. This is shown in FIG. 6.

With reference to FIG. 3, it is seen that voltmeter V is connected between the output of operational amplifier 15 and the circuit common, with the feedback circuit being connected between circuit common and the probe assembly. Feedback from the instrument's electronics drives both sensitive electrode 1 and probe housing 9 to the same potential as the unknown creating an essentially zero field condition which does not disturb charge distribution on the surface under measurement. An insulated gold-plated metal plate may be provided for zeroing and may also serve as a dust cover for probe assembly 7.

Sensitive electrode 1 "looks" at the surface to be measured through aperture 11 in bottom plate 10. The AC signal induced on this electrode is proportional to its excursion path length and the potential difference between the surface to be measured and the probe assembly. The polarity of this difference determines phase.

This signal and a reference signal from reference oscillator 14 are fed to phase sensitive detector 13 whose output feeds DC integrating (operational) amplifier 15. The output of this amplifier is used to drive probe housing 9 and sensitive electrode 1 to the same potential as that of the unknown.

The feedback principle and null-seeking operation combine to produce a remarkably stable and highly accurate instrument.

Some typical and potential applications of the embodiment of the invention shown in FIG. 3 which provides for reliable noncontacting measurement of potential in the millivolt range include:

1. Contact potential measurements.
2. Electrophotographic measurements.
3. Radiation effects on charged surfaces.
4. Airborne particle effects on charged surfaces.
5. Noncontacting resistivity measurements.

With reference to FIG. 4, the voltmeter is connected between the output of operational amplifier 15 and ground (circuit common). Resistor R23 is also connected between the output of the operational amplifier and ground, in parallel connection with voltmeter V. In conjunction with an associated tap, it forms a potentiometer, with the feedback circuit being connected between the tap and probe housing 9. The potentiometer comprising resistor 23 and its associated tap functions as a calibrating potentiometer and provides the correct feedback value for the voltmeter which is now calibrated to read "volts per centimeter". This is not necessary in the embodiment of the invention shown in FIG. 3, because the probe follows the unknown potential exactly and therefore the voltmeter is direct reading.

Sensitive electrode 1 "senses" the field to be measured through small aperture 11 in the probe housing. The AC signal induced on this electrode is proportional to its excursion path length and the strength of the ambient field. THe polarity of this field determines phase.

This signal and a reference signal from oscillator 14 are fed into phase sensitive detector 13 whose output feeds DC integrating (operational) amplifier 15. The output of this amplifier is used to drive the probe bottom plate 10 to a potential just sufficient to neutralize the net field at the sensitive electrode.

This feedback principle and null seeking operation combine to make a remarkably stable and highly accurate instrument.

The aperture 11 shown in FIG. 4 is smaller than that shown in FIG. 3 because extreme sensitivity is not needed to obtain electrostatic field measurements compared to the electrostatic potential of surfaces. A gold-plated cover plate may be provided to fit over the bottom plate 10 shown in FIG. 3, having an aperture of smaller size in order to adapt it for use as an electrostatic fieldmeter probe assembly.

Some typical applications of the embodiment of the invention shown in FIG. 4 include:

1. Charge accumulation monitoring and control.
2. Safety monitoring near radioactive sources or in explosive atmospheres.
3. Monitoring Van de Graaff or other high voltage generators.
4. Atmospheric electricity measurements.
5. High voltage DC transmission terminal measurements.
6. Safe operation in many hazardous environments.

Figure 7:
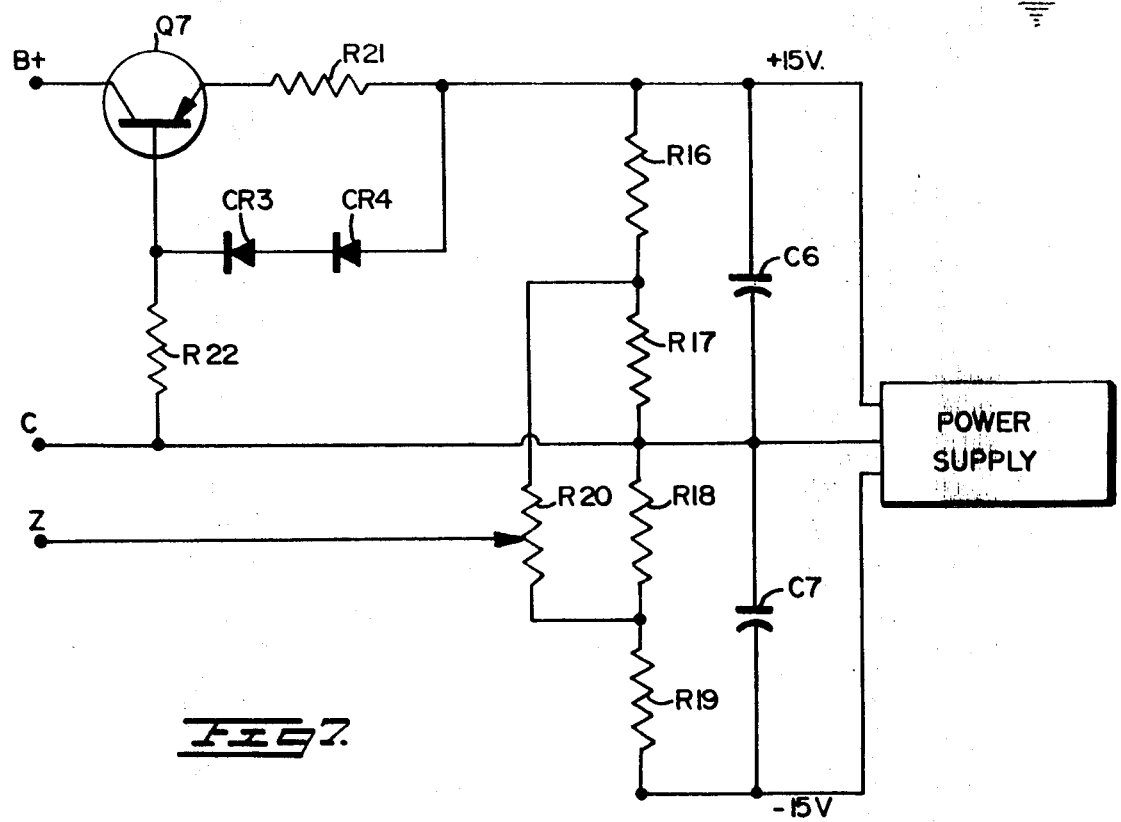
FIG. 7 is an electrical schematic diagram of the power supply and its associated current limiting circuit according to the invention.

FIG. 7 shows the power supply used according to the invention. An extremely stable power supply is employed, with its output being stabilized to within 0.01 percent. The power supply has three output terminals, the positive (+) supply terminal, the negative (−) supply terminal, and the power supply common, or as identified above, the circuit common line C. The positive and negative supply terminals respectively are at (+) and (−) 15 volts.

Capacitors C6 and C7 are respectively connected between the positive and negative supply terminals and the circuit common. Additionally, the series connection of resistors R16 and R17 are connected between the circuit common and the positive supply terminal, and the series connection of resistors R18 and R19 are connected between the circuit common and the negative supply terminal. Capacitors C6 and C7 are each in the range of 100 microfarads. In conjunction with resistors R16 through R19, they function to stabilize the DC operating voltages of the preamplifier by preventing transient fluctuations in the power supply. Connections may also be provided (not shown) to the other electronic circuits to provide operating supplies thereto. A potentiometer comprising resistor R20 connected between the series connection of resistors R16, R17 and the series connection of resistors R18, R19 is provided to obtain zero adjustment. Thus the tap associated with the potentiometer comprising resistor R20 is connected to the zero connection line Z to apply a DC voltage thereto as shown in FIG. 2. The zero adjustment line is connected through resistors R1 and R5 to sensitive electrode 1, and provides for zero adjustment of the latter.

One of the primary uses of an electrostatic fieldmeter is the detection of static charges built up in hazardous environments such as those conducive to explosions. Such buildups must be kept at a safe level such that explosion sparks do not occur. Further, the probe itself must be intrinsically safe in that conceivable failure thereof should not produce a spark of hazardous energy such that it would cause an explosion.

The energy of a hazardous spark depends upon the explosive medium, but in general is in the order of tenths of a millijoule. To be safe, short circuiting of any capacitor or circuit opening of any inductor circuit should involve the generation of a very low energy spark, if any. The normal positive and negative potential power supplies are in the range of 15 volts, but these are bypassed by capacitors C16 and C17 which comprise capacitors of approximately 100 microfarads each and are capable of storing an excessive amount of energy.

In order to isolate the large energy storage capabilities of these capacitors from the preamplifier, whose current requirements are designed to be less than ten milliamperes, a current limiting circuit is provided between the positive and common supply terminals and the preamplifier. This constitutes a normally saturated 10-milliampere constant current supply.

As shown in FIG. 7, transistor Q7 comprises a PNP transistor. Its collector is connected to the positive supply terminal B+ of the amplifier, and its emitter is connected through resistor R21 to the positive supply terminal (+15 volts) of the power supply. Resistor R22 is connected between the base of transistor Q7 and the circuit common line C, and diodes CR3 and CR4 are connected in series circuit between the series connection of resistor R22 and the base of transistor Q7 and the positive supply terminal of the power supply.

Transistor Q7 comprises a constant current source having as a reference the voltage drop across forward biased silicon junction CR4, whose base-emitter junction, is compensated for by forward biased junction CR3, and whose current is limited by resistor R21. The latter of course is the emitter resistor of transistor Q7.

Therefore, through use of the above-described circuit, the available power supply source is current limited when an attempt is made to draw more than approximately 10 milliamperes therefrom. The DC operating voltages are therefore stabilized and transient fluctuations in the power supply are eliminated. At its normal operating current, transistor Q7 is normally saturated and the voltage drop thereacross the resistor R21 is a fraction of a volt.

If the power supply is short circuited at the preamplifier, the available spark energy is the cable capacitance of the associated connections charged to approximately 15 volts. Assuming a maximum cable capacitance of 0.001 microfarads, the available spark energy would not be sufficient to cause an explosion. It is approximately $10^{15}$ as much as the spark energy capable of storage by capacitors C6 and C7.

The circuits shown merely represent preferred embodiments of the invention. It will be appreciated that minor modifications or additions to circuits shown in the figures could readily be made without departing from the scope of the invention. For instance, it will be appreciated that polarities of the various transistors could be changed with corresponding changes in other circuits and polarities of like voltages. Many other minor modifications could also be made. The invention therefore is to be measured by the scope of the appended claims, rather than limited to the preferred embodiments described herein.

What is claimed is:

1. An electrostatic meter apparatus to measure unknowns such as the electrostatic potential of a surface in noncontacting manner or an electrostatic field comprising:

a capacitive detector positionable in direct electrostatic coupling relationship with the surface or in the electrostatic field to produce a detector signal representative of the magnitude and polarity of the unknown being measured for long-term static measurement, drive means operative to vibrate the capacitive detector at a predetermined frequency to vary the coupling relationship and produce modulated detector signals having a carrier frequency equal to the predetermined frequency, a reference oscillator to produce reference signals at the predetermined frequency, a detector connected to receive the reference signals and modulated detector signals at a fixed phase relationship to demodulate the latter and produce an output signal indicative of the magnitude and polarity of the unknown being measured, a high gain operational amplifier connected to the output of the detector, a housing of conductive material, said capacitive detector being mounted in the housing which provides a substantially isolated environment therefore, and a feedback circuit connected between the output of the operational amplifier and the housing to drive the latter and the sensitive electrode very close to the electrostatic potential being measured to automatically create a substantially zero field condition which does not disturb the electrostatic charge distribution of the surface and thus produces an accurate replica of the unknown potential under measurement.

2. The electrostatic meter apparatus recited in claim 1 wherein the capacitive detector comprises a sandwich having a sensitive electrode and a driven electrode separated by a dielectric material and the drive means comprise an electromechanical transducer, an insulated mounting connecting the electromechanical transducer to the driven electrode to vibrate the sandwich at the predetermined frequency.

3. The electrostatic meter apparatus recited in claim 2 further comprising:

a preamplifier interposed between the capacitive detector and the detector, overload protection means operative in response to preamplifier overload to prevent damage thereto.

4. The electrostatic meter apparatus recited in claim 3 wherein the sensitive electrode is connected to the preamplifier input, decoupling means to block the preamplifier DC bias supply from the sensitive electrode.

5. The electrostatic meter apparatus recited in claim 4 wherein the preamplifier comprises an FET input stage, having a gate, a drain, and a source, and associated gate and output circuits, the overload protection means limiting the FET gate and output circuits to potential values below the destruction potential.

6. The electrostatic meter apparatus recited in claim 1 wherein the reference oscillator is connected to the drive means to apply reference signals thereto at the predetermined frequency.

7. The electrostatic meter apparatus recited in claim 1 further comprising:

a preamplifier interposed between the capacitive detector and the detector, power supply means operatively associated with the preamplifier having current limiting means to limit the amplitude of the current supplied to the preamplifier to maintain the apparatus at predetermined safe operational levels.

8. The electrostatic meter apparatus recited in claim 1 further comprising:

a preamplifier interposed between the capacitive detector and the detector having an FET in its input stage, the FET having a gate, drain, and source, and associated gate and output circuits, overload protection means to maintain the gate and output circuits at operational levels below the destruction levels of the FET under preamplifier overload conditions.

9. The electrostatic meter apparatus recited in claim 8 wherein the overload protection means comprise a first bootstrap circuit connected between the gate and source and a second bootstrap circuit connected between the source and drain.

10. The electrostatic meter apparatus recited in claim 9 wherein the first bootstrap circuit comprises a transistor circuit connected to function as a zener diode and the second bootstrap circuit comprises a zener diode.

11. The electrostatic meter apparatus recited in claim 3 further comprising:

a compact probe housing containing the preamplifier, capacitive detector, and the drive means, shield means to shield the capacitive detector from stray capacitive effects.